(12) United States Patent
Chendake (10) Patent No.: US 11,728,753 B2
(45) Date of Patent: Aug. 15, 2023

(54) DETECTING MOTOR STALL CONDITION

(71) Applicant: Infineon Technologies Austria AG, Villach (AT)

(72) Inventor: Vedant Sadashiv Chendake, Lengkong Tujoh (SG)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 93 days.

(21) Appl. No.: 17/357,433

(22) Filed: Jun. 24, 2021

(65) Prior Publication Data

US 2022/0416702 A1 Dec. 29, 2022

(51) Int. Cl.
| | | |
|---|---|---|
| H02P 21/00 | (2016.01) | |
| H02P 21/22 | (2016.01) | |
| H02P 21/18 | (2016.01) | |
| H02P 21/13 | (2006.01) | |
| H02P 27/12 | (2006.01) | |

(52) U.S. Cl.
CPC ............. *H02P 21/22* (2016.02); *H02P 21/13* (2013.01); *H02P 21/18* (2016.02); *H02P 27/12* (2013.01); *H02P 2207/055* (2013.01)

(58) Field of Classification Search
CPC .......... H02P 21/22; H02P 21/18; H02P 21/13; H02P 27/12

USPC .................................................... 318/400.02
See application file for complete search history.

(56) References Cited

U.S. PATENT DOCUMENTS

| | | | | |
|---|---|---|---|---|
| 2008/0265808 A1* | 10/2008 | Sparey | ................... | H02P 6/182 323/263 |
| 2010/0198480 A1* | 8/2010 | Mertens | .............. | F04D 27/0292 701/100 |
| 2017/0025979 A1 | 1/2017 | Wilson et al. | | |

FOREIGN PATENT DOCUMENTS

| | | |
|---|---|---|
| CN | 107306108 A | 10/2017 |
| WO | 2015027774 A1 | 3/2015 |

OTHER PUBLICATIONS

European Search Report from Corresponding European Patent Application No. 22180875.1, dated Nov. 24, 2022, 8 pages.

\* cited by examiner

*Primary Examiner* — Erick D Glass
(74) *Attorney, Agent, or Firm* — Cooper Legal Group, LLC (57) ABSTRACT

According to some embodiments, a method for controlling a motor comprises generating a stall threshold based on a torque generating current parameter associated with the motor. A motor stall condition is identified based on a torque generating voltage parameter associated with the motor violating the stall threshold. Operation of the motor is adjusted responsive to identifying the motor stall condition.

20 Claims, 6 Drawing Sheets

DETECTING MOTOR STALL CONDITION

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for fans, pumps, compressors, geared motors, and the like. Sensorless FOC techniques for a three-phase PMSM require estimation of motor speed and position. FOC decouples three-phase stator winding currents into two independent components, a torque generating component and a flux generating component. Stall conditions, where the load torque exceeds the motor shaft torque, are difficult to detect given the sensorless configuration.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor is provided. The method includes generating a stall threshold based on a torque generating current parameter associated with the motor. A motor stall condition is identified based on a torque generating voltage parameter associated with the motor violating the stall threshold. Operation of the motor is adjusted responsive to identifying the motor stall condition.

According to some embodiments, a motor controller configured to control a drive signal for a motor is provided. The motor controller includes a feedback unit configured to receive a three-phase motor current measurement and transform the three-phase motor current measurement to generate a torque generating current parameter associated with the motor. A first controller is configured to generate a demand speed parameter. A second controller is configured to generate a demand torque generating voltage parameter based on the demand speed parameter and the torque generating current parameter. A stall detection unit is configured to generate a stall threshold based on the torque generating current parameter, identify a motor stall condition based on the demand torque generating voltage parameter violating the stall threshold, and adjust operation of the motor responsive to identifying the motor stall condition.

According to some embodiments, a method for controlling a motor is provided. The method includes receiving a three-phase motor current measurement. The three-phase motor current measurement is transformed to generate a flux generating current parameter and a torque generating current parameter associated with the motor. An estimated motor speed parameter is generated based on the torque generating current parameter and the flux generating current parameter. A drive signal for the motor is generated based on a demand speed parameter and the estimated motor speed parameter. A stall threshold is generated based on the torque generating current parameter. A motor stall condition is identified based on a component of the drive signal violating the stall threshold. Operation of the motor is adjusted responsive to identifying the motor stall condition To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In addition to motor control functions, the processing time of a microcontroller used in a motor controller is also shared to provide user interfaces and other functionality. Providing motor control without computationally intensive techniques, such as transforms requiring quadric equations, allows increased functionality to be provided in systems with reduced complexity, lower cost microcontrollers.

Figure 1:
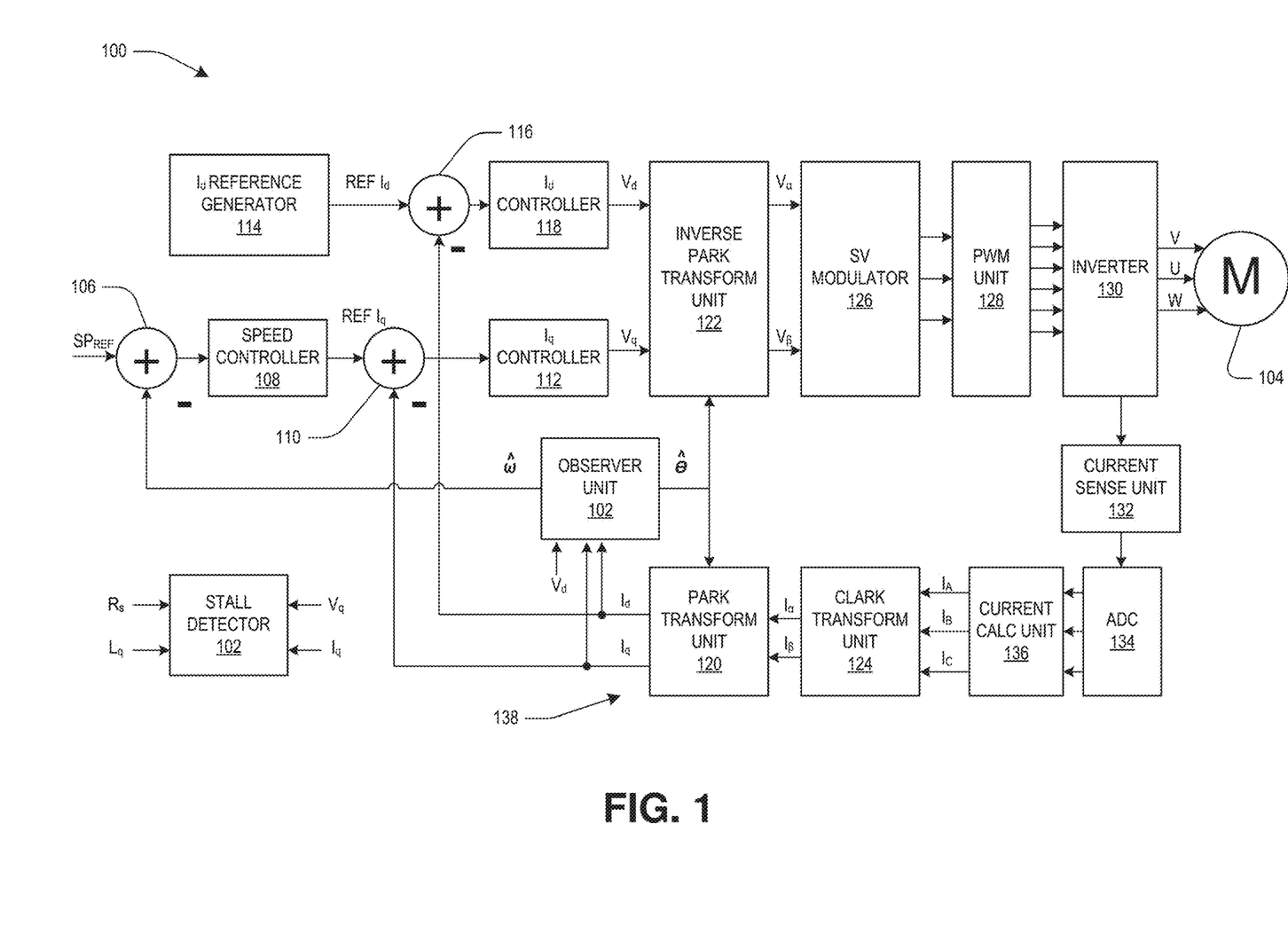
FIG. 1 is a schematic diagram of a motor controller, according to some embodiments.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this application is not intended to be limiting, and is for ease of discussion and illustrative convenience. The techniques and devices discussed may be applied to other motor designs, control structures, and the like (e.g., single-phase and three-phase variable frequency drives, digital phase converters, three-phase and single-phase motors, induction motors, regenerative drives, etc.), and remain within the scope of the disclosure. FIG. 1 is a schematic diagram of a motor controller 100, according to some embodiments. The motor controller 100 shown in FIG. 1 is a sensorless controller that uses an observer unit 102 to estimate a rotor position, $\hat{\theta}$, and a rotor speed, $\hat{\omega}$, to support FOC techniques for controlling a motor 104. Rotor speed is indicative of motor speed. To implement FOC control, the motor controller 100 uses a Park transform to convert between a D-Q rotor fixed reference frame defined by a torque generating component, Q, and a flux generating component, D, and an $\alpha$-$\beta$ stationary reference frame and a Clarke transform to convert between a three-phase reference frame defined by V, U, and W components to the $\alpha$-$\beta$ stationary reference frame. The $\alpha$-$\beta$ stationary reference frame signals are sinusoidal signals at steady state, and the D-Q rotor fixed reference frame signals are nearly constant at steady state. Park transforms, inverse Park transforms, and Clarke transforms are known in the motor control art and are not described in greater detail herein. In some embodiments, a stall detection unit 103 detects a stall condition of the motor 104 using D-Q rotor fixed reference frame parameters. In sensorless control, a motor stall can occur when the estimated angle is inaccurate or reference frames are out of sync. In particular, such conditions may occur during a transient even when the motor is operating at a lower load condition. In some embodiments, detecting a motor stall using the estimated speed generated by the observer unit 102 may lead to false or missed stall detections, especially at low speeds. Using the D-Q rotor fixed reference frame parameters to detect a motor stall condition avoids the need to provide a hardware speed sensor on the motor 104, thereby reducing cost and complexity. In some embodiments, the stall detection unit 103 is suitable to detect a stall condition for multiple motor types, such as a PMSM or a brushless DC motor (BDCM).

In the three-phase reference frame, the U, V, and W components are separated by 120° and are stationary. In the $\alpha$-$\beta$ stationary reference frame, the components are electrically orthogonal and stationary. In the D-Q rotor fixed reference frame, the components are electrically orthogonal and rotating. For purposes of this description it is assumed that the motor 104 rotates in a positive direction, i.e., the counterclockwise direction, so the angles and angular speeds are positive numbers. The signs of the angles and angular speeds may be changed for a motor 104 that rotates in the negative direction, i.e., the clockwise direction. Coordinate systems may be referenced to the stator and/or the rotor of the motor 104. For example, the D-Q rotor fixed reference frame is fixed to the rotor and the components of the D-Q coordinate system rotate together. The direct axis of the D-Q rotor fixed reference frame is oriented in the direction from the rotor permanent magnet south pole (S) to north pole (N). The quadrature axis of the D-Q rotor fixed reference frame is perpendicular to the rotor flux (e.g., to the rotor).

The three-phase sinusoidal currents $I_U$, $I_V$, and $I_W$ of the motor stator windings are separated by 120° and generate three non-rotating, pulsating magnetic fields in the U, V, and W directions, respectively, resulting in a rotating magnetic field (stator flux space vector). Vector addition of $I_U$, $I_V$, and $I_W$ gives a current space vector. The magnitude of the current space vector may be scaled up or down with no change of direction for a motor rotating at speed, $\omega_i$.

In the stationary $\alpha$-$\beta$ reference frame, the rotating stator flux space vector represents the rotating stator magnetic flux. Vector addition of the three-phase 120° separated stator phase voltages $V_U$, $V_V$, and $V_W$ defines a rotating voltage space vector. A rotating rotor permanent magnet generates a rotating rotor magnetic flux space vector. The magnitudes and directions of the above-mentioned rotating space vectors can be represented by radial coordinates and polar angles in polar coordinate systems. Techniques for transforming between the reference frames are known in the art.

Referring to FIG. 1, a reference speed, $SP_{REF}$, representing a desired rotational speed for the motor 104, is received as an input and is provided to an adder 106 which also receives rotor speed feedback from the observer unit 102 to generate an error signal for input to a speed controller 108. In some embodiments, the speed controller 108 is a proportional-integral (PI) controller that operates to drive its input error signal to zero. An output of the speed controller 108 is provided to an adder 110 that also receives a feedback torque generating current parameter ($I_q$). The adder 110 provides an input signal to an $I_q$ controller 112. In some embodiments, the $I_q$ controller 112 is a proportional-integral (PI) controller that operates to drive its input signal, which represents an error signal to zero.

A reference generator 114 provides a reference flux generating current parameter (la) as an input to an adder 116. The adder 116 also receives a feedback flux generating current parameter (la) and provides an error signal input to an $I_d$ controller 118. In some embodiments, the $I_d$ controller 118 is a proportional-integral (PI) controller that operates to drive its error input signal to zero. The $I_q$ controller 112 outputs a demand torque generating voltage parameter, $V_q$, and the $I_d$ controller 118 outputs a demand flux generating voltage parameter, $V_d$. In some embodiments, the flux generating component $I_d$ is controlled to zero. In some embodiments, the flux generating component $I_d$ is controlled using a negative reference value to implement flux-weakening control to extend the operating speed range of the motor 104. In some embodiments, the flux generating component $I_d$ is controlled using a positive reference value to implement flux-boosting control.

The motor controller 100 comprises a Park transform unit 120, an inverse Park transform unit 122, and a Clarke transform unit 124 to convert between reference frames. The Park transform unit 120 transforms the $\alpha$-$\beta$ stationary reference frame to the D-Q rotor fixed frame. The inverse Park transform unit 122 transforms the D-Q rotor fixed frame to the $\alpha$-$\beta$ stationary reference frame. The Clarke transform unit 124 transforms the three-phase reference frame to the $\alpha$-$\beta$ stationary reference frame.

The inverse Park transform unit 122 receives the demand torque generating voltage parameter, $V_q$, from the $I_q$ controller 112 and the demand flux generating voltage parameter, $V_d$, from the $I_d$ controller 118 and generates stationary frame voltage parameters, $V_\alpha$, $V_\beta$, as inputs to a space vector modulator 126. The amplitude and angle of the voltage vector defined by $V_\alpha$ and $V_\beta$ provide a reference voltage for the space vector modulator 126 for controlling a pulse width modulation (PWM) unit 128 to generate three-phase sinusoidal waveform output signals to drive an inverter 130. The output signals of the inverter 130 drive the phases of the motor 104. In some embodiments, the inverter 130 comprises a three-phase two-level voltage inverter.

A current sense unit 132 senses phase currents of the motor 104. In some embodiments, the current sense unit 132 comprises three shunt resistors associated with the three legs of the inverter 130 to sense the current of each phase of the motor 104. In some embodiments, two shunt resistors are used to sense the current of two phases of the motor 104. The current from the third phase of the motor 104 may be calculated based on the relationship $I_U+I_V+I_W=0$. In some embodiments, a single shunt resistor is inserted into to a DC link of the inverter 130 to sense a DC link current, and a three-phase current reconstruction is used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_U$, $I_V$, and $I_W$. The phase current measurement parameters are provided to the Clarke transform unit 124 to generate α-β stationary reference frame feedback current parameters, $I_α$, $I_β$. The stationary reference frame feedback current parameters are provided to the Park transform unit 120 to generate a feedback torque generating current parameter, $I_q$, and a feedback flux generating current parameter, $I_d$. The current calculation unit 136, Clarke transform unit 124, and Park transform unit 120 comprise a feedback unit 138 for generating the feedback torque generating current parameter, $I_q$, and the feedback flux generating current parameter, $I_d$.

The observer unit 102 estimates the rotor position, $\hat{θ}$, and the rotor speed, $\hat{ω}$, using data in the D-Q rotor fixed reference frame, thereby avoiding the need to perform additional computationally intensive reference frame transformations. In a Surface Permanent Magnet Synchronous Motor (SPMSM) efficiency is increased by controlling the flux generating current, $I_d$, to zero. A feedback flux generating voltage parameter, $V_d$, may be computed from the motor inductance, La, electric speed (w), and torque producing current, $I_q$. In a flux weakening operating mode when flux generating current $I_d<0$, the rotor position and speed may be estimated based on the motor inductance, $L_Q$, motor resistance, R, electric speed (w), torque generating current, $I_q$, and flux generating current, $I_d$.

Figure 2:
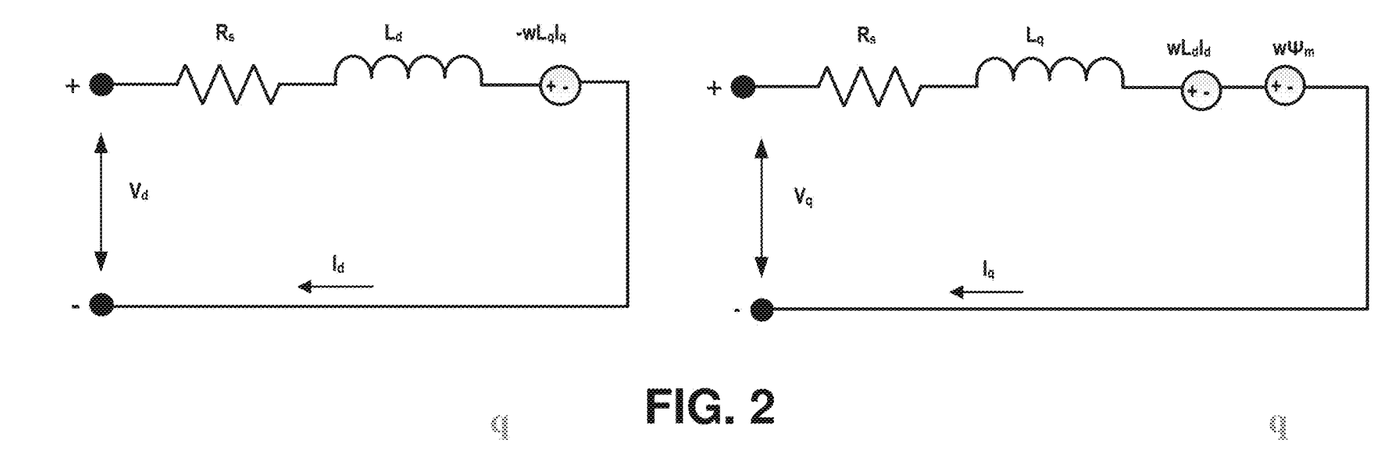
FIG. 2 is a diagram of equivalent circuits for the D-Q rotor-fixed reference frame, according to some embodiments.

FIG. 2 is a diagram illustrating equivalent circuits for the D-Q rotor-fixed reference frame, according to some embodiments. The dynamic D-Q axis voltage equations for a PMSM are:

$$V_d = R_s I_d - ωL_q I_q + L_d \frac{dI_d}{dt} \text{ and} \tag{1}$$

$$V_q = R_s I_q + ωL_d I_d + L_q \frac{dI_q}{dt} + ωΨ_m, \tag{2}$$

where:
$V_d$—Flux generating voltage
$V_q$—Torque generating voltage
$R_s$—Motor phase resistance
$L_d$—Synchronous inductance of motor winding in d-axis
$L_q$—Synchronous inductance of motor winding in q-axis
$I_q$—Torque generating current
$I_d$—Flux generating current
$Ψ_m$—Permanent magnet flux linkage In some embodiments, the motor phase resistance parameter, synchronous inductance parameters, and the permanent magnet flux linkage represent motor specification sheet reference values rather than dynamically determined parameters. Since $I_d$ and $I_q$ are DC values, their derivatives become negligible under steady-state, and therefore, equations 1 and 2 can be simplified as:

$$V_d=R_s I_d-ωL_q I_q \text{ and} \tag{3}$$

$$V_q=R_s I_q+ωL_d I_d+ωΨ_m \tag{4}$$

The PSSM electromagnetic torque equation is:

$$T_e=\tfrac{3}{2}P(Ψ_m I_q+(L_d-L_q)I_d I_q), \tag{5}$$

where P is the number of permanent magnet poles.

For a SPMSM, $L_q=L_d$ and only reaction torque contributes to the electromagnetic torque. Equation (5) can be simplified for SPMSM as:

$$T_e=\tfrac{3}{2}PΨ_m I_q. \tag{6}$$

From equation (6) it is evident that to increase efficiency of an SPMSM the flux generating current component can be set to zero since the flux generating current does not contribute to torque.

Setting $I_d$ to zero allows Equation 3 to be simplified to:

$$V_d=-ωL_q I_q \tag{7}$$

Figure 3:
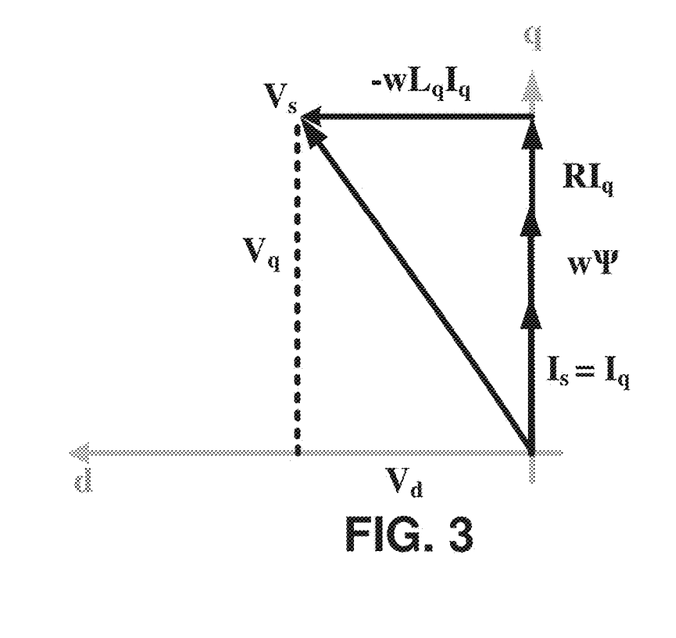
FIG. 3 is a diagram of a phasor representation of a permanent magnet synchronous motor with the flux generating current set to zero, according to some embodiments.

FIG. 3 is a diagram of a phasor representation of a PMSM with the flux generating current, $I_d$, set to zero, according to some embodiments. In the phasor diagram of FIG. 3:

$$V_s = \sqrt{V_d^2 + V_q^2} \text{ and} \tag{8}$$

$$I_s = \sqrt{I_d^2 + I_q^2}. \tag{9}$$

In equation (7) the only unknown parameter is the rotor speed, co. The rotor angle can be calculated from the estimated rotor speed, Equation (7) is independent of motor resistance, so rotor position and speed estimation are not affected due to changes in motor resistance as an effect of motor temperature rise. The rotor position, $\hat{θ}$, is calculated by integrating the speed according to:

$$\hat{θ}=\int\hat{ω}dt. \tag{10}$$

Direct flux weakening is generally not possible with permanent magnet motors; however, similar effects can be achieved by extending the current vector beyond 90° to the rotor flux axis by introducing a negative flux generating current component, i.e., $I_d<0$.

An interior permanent magnet synchronous motor (IP-MSM) is magnetically salient ($L_q>L_d$). From motor torque equation (5), it is evident that the higher the ratio between $L_q$ and $L_d$, the higher the amount of reluctance torque exists. A Maximum Torque Per Ampere (MTPA) algorithm may be used to utilize reluctance torque to select the magnitude of the negative value for $I_d$.

Figure 4:
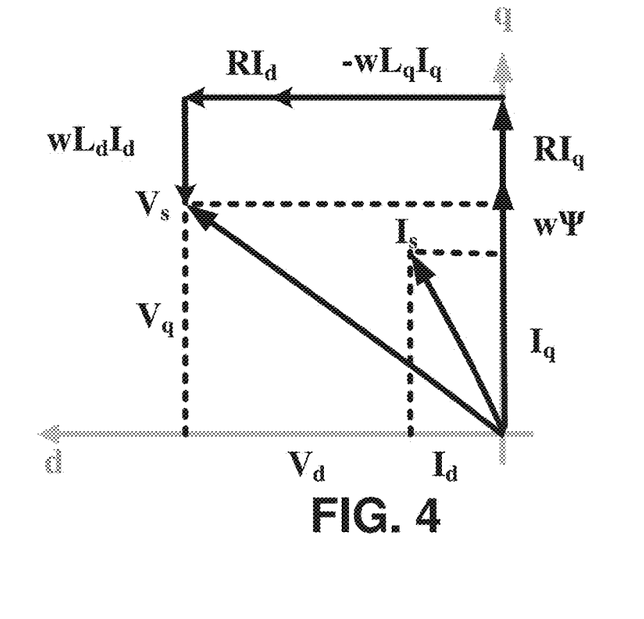
FIG. 4 is a diagram of a phasor representation of a permanent magnet synchronous motor with the flux generating current set to a negative value to implement flux weakening control, according to some embodiments.

FIG. 4 is a diagram of a phasor representation of a PMSM with the flux generating current, $I_d$, set at a negative value to implement flux weakening control, according to some embodiments. It is apparent from FIG. 4 that the flux generating voltage, $V_d$, is dependent on motor resistance, so the rotor speed estimation described by Equation 7 cannot be used. However, equation (3) may be used to estimate the rotor speed, and equation 10 may be used to estimate the rotor position. In general, PMSM motor parameters are not constant during operation. For example, the actual motor stator resistance varies significantly from the value specified by the motor data sheet depending temperature. Motor resistance variation due to temperature change can degrade the rotor estimation accuracy and aggravate control performance, especially at low speed.

Below nominal speed, flux generating current is controlled to zero for higher efficiency. Above nominal speed in the flux weakening region with a negative flux generating current, la, the inductor voltage drop is much higher than the resistance voltage drop for $V_d$. Hence the change in motor resistance due to temperature rise does not have a significant impact on the rotor position estimation.

$$\omega L_q I_q >> R_s I_d. \quad (11)$$

Figure 5:
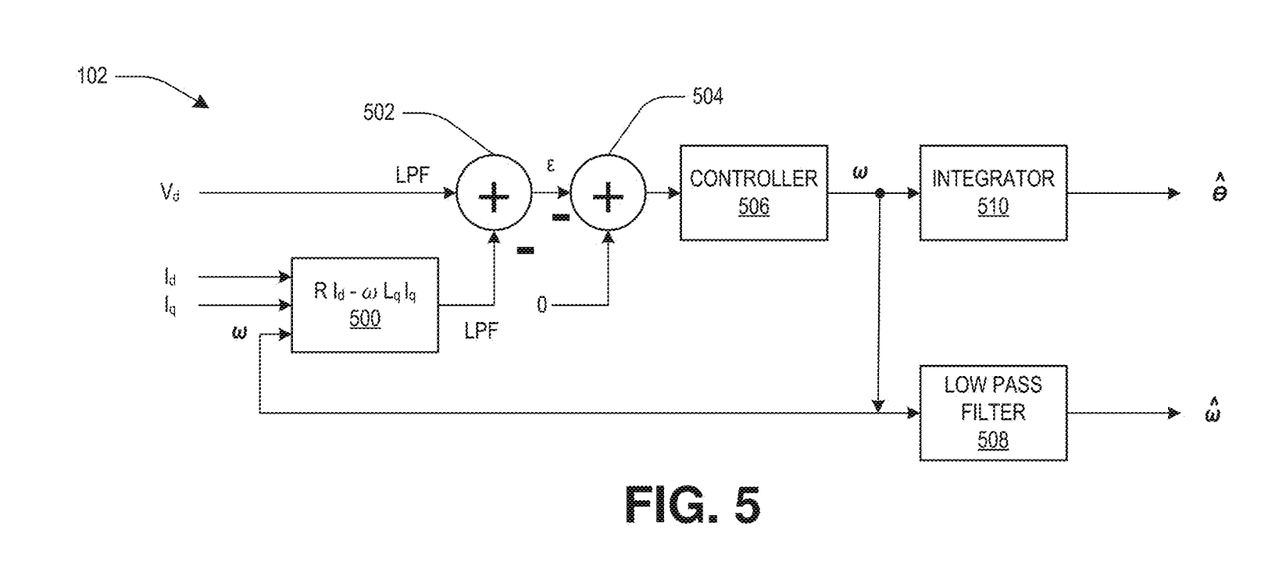
FIG. 5 is a schematic diagram of an embodiment of an observer unit, according to some embodiments.

FIG. 5 is a schematic diagram of an embodiment of the observer unit 102, according to some embodiments. The observer unit 102 comprises a calculation unit 500 that determines a feedback flux generating voltage parameter R $I_d - \omega L_q I_q$. The motor resistance parameter, R, and the motor inductance parameter, $L_q$, represent motor data sheet values. An adder 502 subtracts the feedback flux generating voltage parameter from the demand flux generating voltage parameter, $V_d$, calculated by the $I_d$ controller 118 to generate a flux generating voltage error parameter, ε. An adder 504 generates an error signal for a controller 506. The controller 506 controls the error signal, E to the zero reference provided to the adder 504.

The observer unit 102 uses the controller 506 to implement a phase locked loop (PLL) to estimate the rotor speed, $\hat{\omega}$. In some embodiments, the controller 506 is a proportional-integral controller. Other structures and configurations of the controller 506 are within the scope of the present disclosure. For example, a hysteresis controller or a sliding mode controller may be used. The calculation unit 500 receives the estimated rotor speed from the previous iteration of the PLL to estimate the current rotor speed. A low pass filter 508 receives the output from the controller 506 to remove high-frequency noise to reduce erroneous estimation due to noise. An integrator unit 510 integrates the rotor speed, $\hat{\omega}$, output by the controller 506 to estimate the rotor position, $\hat{\theta}$. The observer unit 102 estimates the rotor speed and the rotor position within one electrical cycle in a closed loop.

The observer unit 102 of FIG. 5 supports varying controlled levels of the flux generating current, $I_d$, such as $I_d=0$, $I_d<0$ (flux weakening), or $I_d>0$ (flux boosting), for SPMSM and MTPA control in the case of IPMSM control. Since motor resistance does not significantly impact the rotor speed estimation, the nominal motor resistance may be used, obviating the need to dynamically estimate resistance changes resulting from temperature.

A motor stall condition occurs when the load torque is greater than the motor shaft torque. During this condition, the motor 104 does not rotate, even when there is sufficient voltage at its terminals. At a stall condition, the motor 104 drains the maximum current and the motor speed approaches zero. The motor stall current is typically significantly higher than normal operating current, and the stall current can damage the inverter 130 as well as motor 104. For example, motors with low inductance have very high stall currents which can easily damage the inverter 130.

The stall detection unit 103 operates in the D-Q rotor-fixed reference frame using the equivalent circuits illustrated in FIG. 2. During a motor stall condition, the motor speed, ω, approaches zero even if sufficient terminal voltage is present. Under such conditions, equations 1 and 2 can be rewritten as:

$$V_{d\_stall} = R_s I_d + L_d \frac{dI_d}{dt} \text{ and} \quad (12)$$

$$V_{q\_stall} = R_s I_q + L_q \frac{dI_q}{dt}. \quad (13)$$

Considering an operating mode where $I_d=0$, and under a motor stall condition where $\omega \approx 0$, equation 3 can be rewritten as:

$$V_d=0. \quad (14)$$

To detect a stall condition in an SPMSM ($L_q=L_d$) and in an IPMSM ($L_q>L_d$), equations 2 and 13 are used. Using equations 2 and 13, it is possible to detect the motor stall condition in the field weakening region and the MTPA region where a negative flux generating current reference parameter, $I_d$, is used. The voltage difference between Vq in equation 2 and $V_{q\_stall}$ in equation 13 reduces as it approaches to the motor stall condition:

$$V_q \approx V_{q\_stall} \quad (15)$$

In a low inductance or ultra-low inductance motor, the stall current is significantly higher than the normal operating current, and the stall current sufficient may damage the motor 104 or the inverter 130. Hence, to detect an impending motor stall prior to the maximum stall current being generated, equation 15 is modified to include a stall ratio to define a stall threshold:

$$V_q \approx STALL\_RATIO * V_{q\_stall}. \quad (16)$$

Setting the stall ratio greater than 1 allows early stall detection. In some embodiments, the stall ratio is adjusted based on the characteristics of the motor 104 and/or the inverter 130 regarding maximum current. A stall ratio greater than one results in the stall condition being detected at low motor speed before the motor speed reaches zero and the maximum stall current is generated.

Figure 6A:
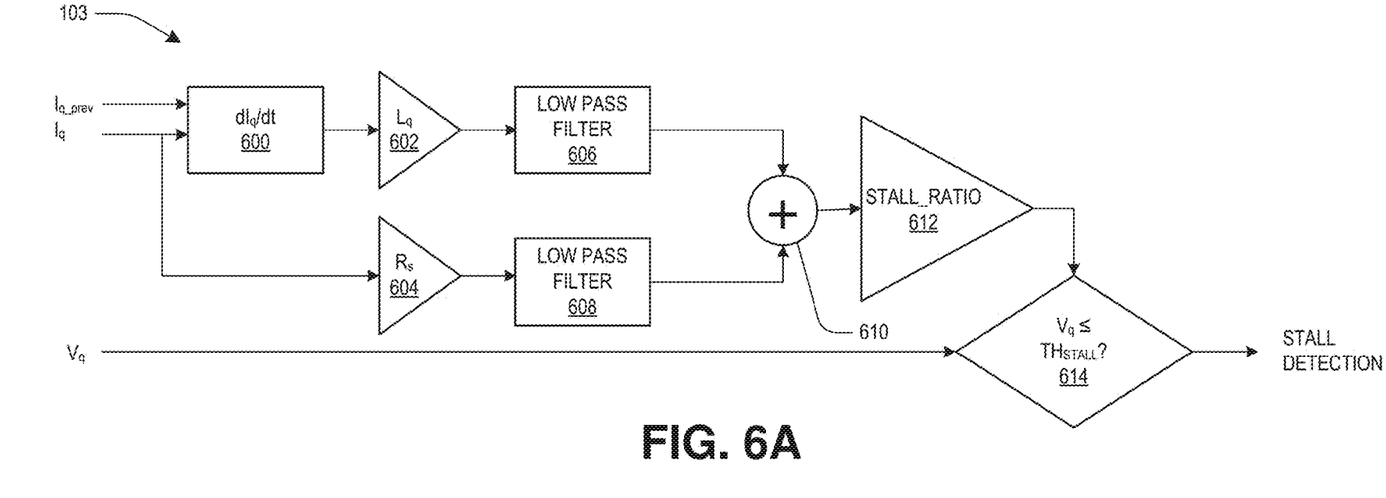
FIGS. 6A and 6B are schematic diagrams of embodiments of a stall detection unit, according to some embodiments.

FIG. 6A is a schematic diagram of an embodiment of the stall detection unit 103, according to some embodiments. The stall detection unit 103 comprises a derivative unit 600 that receives the current and previous values of the feedback torque generating current parameter to generate a derivative term and a gain unit 602 to multiply the derivative term by the motor inductance parameter, $L_q$, to generate:

$$L_q \frac{dI_q}{dt}.$$

A gain unit 604 multiples the feedback torque generating current parameter by the rated resistance of the motor, Rs, to generate:

$$R_s I_q$$

In some embodiments, a low pass filter 606 receives the output of the gain unit 602 and a low pass filter 608 receives the output of the gain unit 604 to reduce noise in the respective signals. An adder 610 receives the outputs of the low pass filter 606 and the low pass filter 608 to generate the $V_{q\_stall}$ parameter shown in equation 13. A gain unit 612 multiplies the $V_{q\_stall}$ parameter by the stall ratio to generate a stall threshold, $TH_{STALL}$. A comparator 614 compares the demand torque generating voltage parameter, $V_q$, to the stall threshold and indicates a motor stall detection responsive to $V_q$ violating the stall threshold.

Figure 6B:
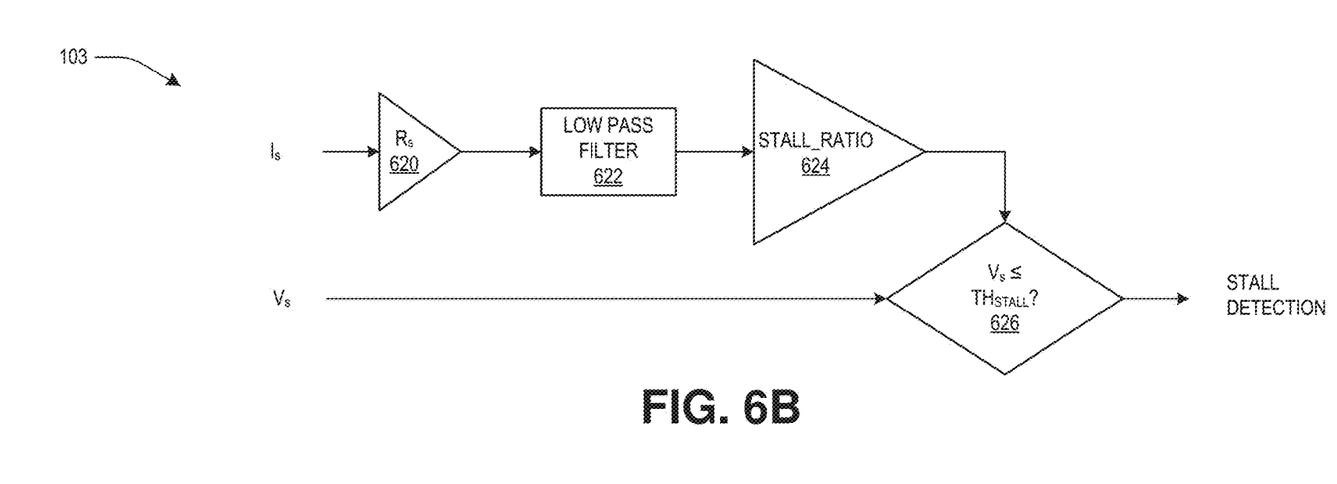

FIG. 6B is a schematic diagram of an alternative embodiment of the stall detection unit 103, according to some embodiments. The stall detection unit 103 of FIG. 6B employs the magnitude of $V_s$ and the magnitude of $I_s$, specified in equations 8 and 9 to identify a stall condition. The stall detection unit 103 comprises a gain unit 620 to multiply $I_s$ by the motor resistance parameter, $R_s$, to generate a voltage feedback parameter:

$$V_f = R_s * I_s.$$

A low pass filter 622 receives the output of the gain unit 620 to reduce high frequency noise in the signal. A gain unit 624 multiplies the $V_f$ parameter by the stall ratio to generate a stall threshold, $TH_{STALL}$. A comparator 626 compares $V_s$ to the stall threshold and indicates a motor stall detection responsive to $V_s$ violating the stall threshold.

Responsive to identifying the stall condition, the operation of the motor 104 is adjusted. In some embodiments, adjusting the operation of the motor comprises stopping the motor driving signals, for example, by setting the demand speed provided to the speed controller 108 to zero. In some embodiments, one or more motor restarts are implemented in response to the motor stall condition by alternating between a zero demand speed and the previous value of the demand speed prior to the stall detection for a predetermined number of times. In some embodiments, a motor reversal is implemented by setting a negative demand speed for a predetermined period of time, followed by a return to the demand speed prior to the stall detection. If a subsequent stall condition is detected after the predetermined number of restarts or after the motor reversal, the motor may be stopped by setting the demand speed to zero.

Furthermore, some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design. In some embodiments, the motor 104, inverter 130, ADC 134, and the current sense unit 132 are hardware-implemented and the remaining units in FIG. 1 are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 7:
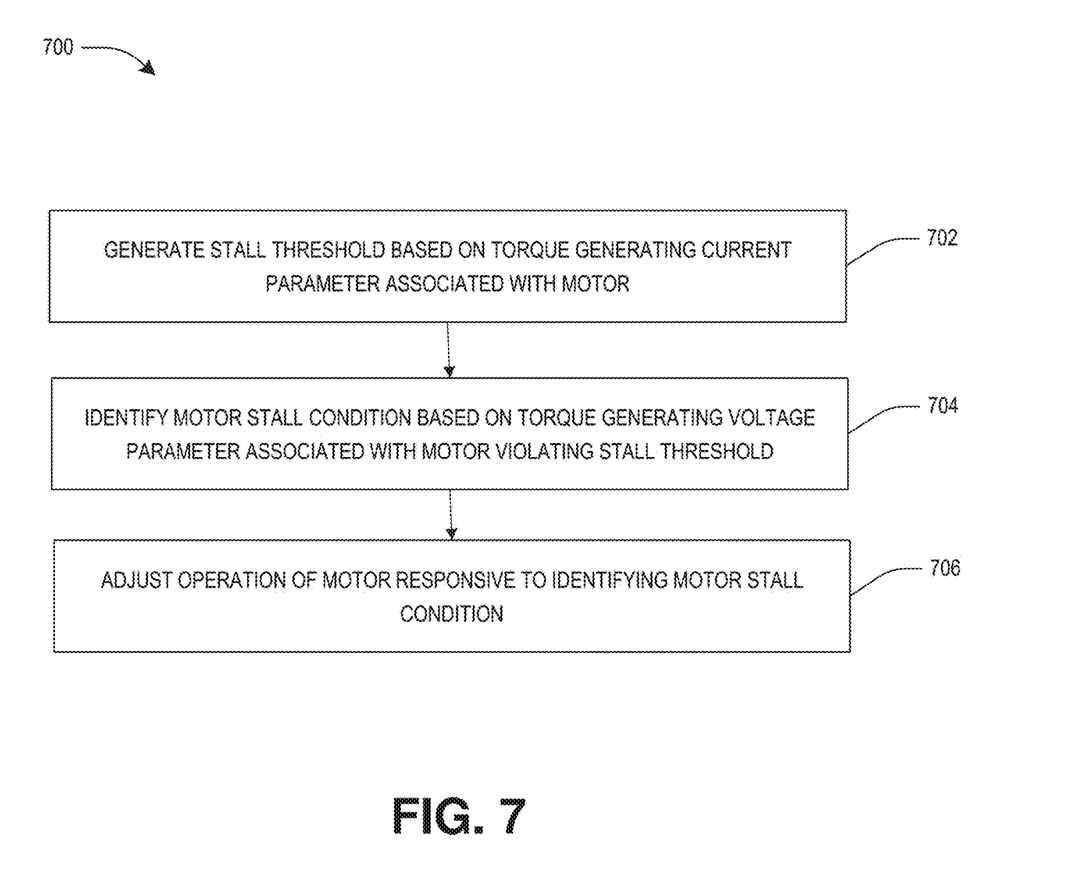
FIG. 7 illustrates a method of controlling a motor, according to some embodiments.

FIG. 7 illustrates a method 700 for controlling a motor. At 702 a stall threshold is generated based on a torque generating current parameter associated with the motor. At 704, a motor stall condition is detected based on a torque generating voltage parameter associated with the motor violating the stall threshold. At 706, operation of the motor is adjusted responsive to identifying the motor stall condition.

Figure 8:
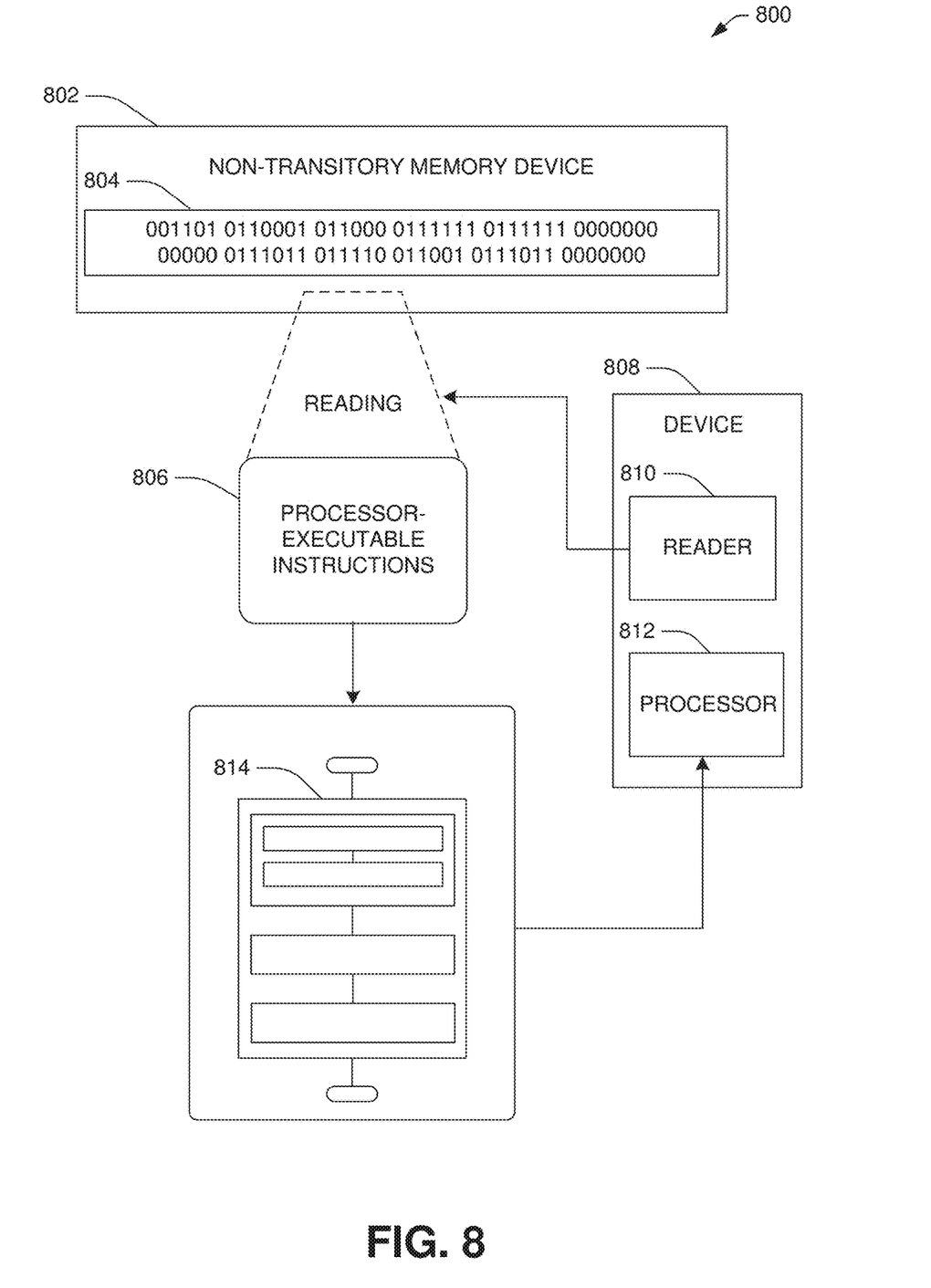
FIG. 8 illustrates an exemplary computer-readable medium, according to some embodiments.

FIG. 8 illustrates an exemplary embodiment 800 of a computer-readable medium 802, according to some embodiments. One or more embodiments involve a computer-readable medium comprising processor-executable instructions configured to implement one or more of the techniques presented herein. The embodiment 800 comprises a non-transitory computer-readable medium 802 (e.g., a CD-R, DVD-R, flash drive, a platter of a hard disk drive, etc.), on which is encoded computer-readable data 804. This computer-readable data 804 in turn comprises a set of processor-executable computer instructions 806 that, when executed by a computing device 808 including a reader 810 for reading the processor-executable computer instructions 806 and a processor 812 for executing the processor-executable computer instructions 806, are configured to facilitate operations according to one or more of the principles set forth herein. In some embodiments, the processor-executable computer instructions 806, when executed, are configured to facilitate performance of a method 814, such as at least some of the aforementioned method(s). In some embodiments, the processor-executable computer instructions 806, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method for controlling a motor comprises generating a stall threshold based on a torque generating current parameter associated with the motor. A motor stall condition is identified based on a torque generating voltage parameter associated with the motor violating the stall threshold. Operation of the motor is adjusted responsive to identifying the motor stall condition.

According to some embodiments, generating the stall threshold comprises generating the stall threshold based on a rate of change of the torque generating current parameter.

According to some embodiments, generating the stall threshold comprises multiplying the rate of change of the torque generating current parameter by a motor inductance parameter to generate a first component, multiplying the torque generating current parameter by a motor resistance parameter to generate a second component, adding the first component to the second component to generate a third component, and multiplying the third component by a stall ratio to generate the stall threshold.

According to some embodiments, the stall ratio is greater than or equal to one.

According to some embodiments, generating the stall threshold comprises generating the stall threshold based on a magnitude of the torque generating current parameter and a flux generating current parameter associated with the motor.

According to some embodiments, generating the stall threshold comprises multiplying the magnitude of the torque generating current parameter and the flux generating current parameter by a motor resistance parameter to generate a first component and multiplying the first component by a stall ratio to generate the stall threshold.

According to some embodiments, the stall ratio is greater than or equal to one.

According to some embodiments, a motor controller configured to control a drive signal for a motor comprises a feedback unit configured to receive a three-phase motor current measurement and transform the three-phase motor current measurement to generate a torque generating current parameter associated with the motor. A first controller is configured to generate a demand speed parameter. A second controller is configured to generate a demand torque generating voltage parameter based on the demand speed parameter and the torque generating current parameter. A stall detection unit is configured to generate a stall threshold based on the torque generating current parameter, identify a motor stall condition based on the demand torque generating voltage parameter violating the stall threshold, and adjust operation of the motor responsive to identifying the motor stall condition.

According to some embodiments, an observer unit is configured to generate an estimated motor speed based on the torque generating current parameter. The first controller is configured to generate the demand speed parameter based on a speed input parameter and the estimated motor speed.

According to some embodiments, a third controller is configured to generate a demand flux generating voltage parameter. The feedback unit is configured to transform the three-phase motor current measurement to generate a feedback flux generating current parameter. The third controller is configured to generate the demand flux generating voltage parameter based on a reference flux generating current parameter and the feedback flux generating current parameter. The observer unit is configured to generate the estimated motor speed based on the torque generating current parameter and the flux generating current parameter.

According to some embodiments, the reference flux generating current parameter is zero.

According to some embodiments, the stall detection unit is configured to generate the stall threshold based on a magnitude of the torque generating current parameter and the flux generating current parameter. The stall detection unit is configured to identify the motor stall condition responsive to a magnitude of the demand torque generating voltage parameter and the demand flux generating voltage parameter violating the stall threshold.

According to some embodiments, the stall detection unit is configured to generate the stall threshold by multiplying the magnitude of the torque generating current parameter and the flux generating current parameter by a motor resistance parameter to generate a first component and multiplying the first component by a stall ratio to generate the stall threshold.

According to some embodiments, the stall ratio is greater than or equal to one.

According to some embodiments, the stall detection unit is configured to generate the stall threshold based on a rate of change of the torque generating current parameter.

According to some embodiments, the stall detection unit is configured to generate the stall threshold by multiplying the rate of change of the torque generating current parameter by a motor inductance parameter to generate a first component, multiplying the torque generating current parameter by a motor resistance parameter to generate a second component, adding the first component to the second component to generate a third component, and multiplying the third component by a stall ratio to generate the stall threshold.

According to some embodiments, a method for controlling a motor comprises receiving a three-phase motor current measurement. The three-phase motor current measurement is transformed to generate a flux generating current parameter and a torque generating current parameter associated with the motor. An estimated motor speed parameter is generated based on the torque generating current parameter and the flux generating current parameter. A drive signal for the motor is generated based on a demand speed parameter and the estimated motor speed parameter. A stall threshold is generated based on the torque generating current parameter. A motor stall condition is identified based on a component of the drive signal violating the stall threshold. Operation of the motor is adjusted responsive to identifying the motor stall condition.

According to some embodiments, the component of the drive signal comprises a demand torque generating voltage parameter and generating the stall threshold comprises multiplying a rate of change of the torque generating current parameter by a motor inductance parameter to generate a first component, multiplying the torque generating current parameter by a motor resistance parameter to generate a second component, adding the first component to the second component to generate a third component, and multiplying the third component by a stall ratio to generate the stall threshold.

According to some embodiments, generating the stall threshold comprises determining a magnitude of the torque generating current parameter and the flux generating current parameter, multiplying the magnitude of the torque generating current parameter and the flux generating current parameter by a motor resistance parameter to generate a first component, and multiplying the first component by a stall ratio to generate the stall threshold.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for controlling a motor comprising:
generating a stall threshold based on a torque generating current parameter associated with the motor;
identifying a motor stall condition based on a torque generating voltage parameter associated with the motor violating the stall threshold; and
adjusting operation of the motor responsive to identifying the motor stall condition.

2. The method of claim 1, wherein:
generating the stall threshold comprises generating the stall threshold based on a rate of change of the torque generating current parameter.

3. The method of claim 2, wherein:
generating the stall threshold comprises:
multiplying the rate of change of the torque generating current parameter by a motor inductance parameter to generate a first component;
multiplying the torque generating current parameter by a motor resistance parameter to generate a second component;
adding the first component to the second component to generate a third component; and
multiplying the third component by a stall ratio to generate the stall threshold.

4. The method of claim 3, wherein:
the stall ratio is greater than or equal to one.

5. The method of claim 1, wherein:
generating the stall threshold comprises generating the stall threshold based on a magnitude of the torque generating current parameter and a flux generating current parameter associated with the motor.

6. The method of claim 5, wherein:
generating the stall threshold comprises:
multiplying the magnitude of the torque generating current parameter and the flux generating current parameter by a motor resistance parameter to generate a first component; and
multiplying the first component by a stall ratio to generate the stall threshold.

7. The method of claim 6, wherein:
the stall ratio is greater than or equal to one.

8. A motor controller configured to control a drive signal for a motor comprising:
a feedback unit configured to receive a three-phase motor current measurement and transform the three-phase motor current measurement to generate a torque generating current parameter associated with the motor;
a first controller configured to generate a demand speed parameter;
a second controller configured to generate a demand torque generating voltage parameter based on the demand speed parameter and the torque generating current parameter; and
a stall detection unit configured to generate a stall threshold based on the torque generating current parameter, identify a motor stall condition based on the demand torque generating voltage parameter violating the stall threshold, and adjust operation of the motor responsive to identifying the motor stall condition.

9. The motor controller of claim 8, comprising:
an observer unit configured to generate an estimated motor speed based on the torque generating current parameter, wherein:
the first controller is configured to generate the demand speed parameter based on a speed input parameter and the estimated motor speed.

10. The motor controller of claim 9, comprising:
a third controller configured to generate a demand flux generating voltage parameter, wherein:
the feedback unit is configured to transform the three-phase motor current measurement to generate a feedback flux generating current parameter;
the third controller is configured to generate the demand flux generating voltage parameter based on a reference flux generating current parameter and the feedback flux generating current parameter; and
the observer unit is configured to generate the estimated motor speed based on the torque generating current parameter and the flux generating current parameter.

11. The motor controller of claim 10, wherein:
the reference flux generating current parameter is zero.

12. The motor controller of claim 10, wherein:
the stall detection unit is configured to generate the stall threshold based on a magnitude of the torque generating current parameter and the flux generating current parameter; and
the stall detection unit is configured to identify the motor stall condition responsive to a magnitude of the demand torque generating voltage parameter and the demand flux generating voltage parameter violating the stall threshold.

13. The motor controller of claim 12, wherein:
the stall detection unit is configured to generate the stall threshold by:
multiplying the magnitude of the torque generating current parameter and the flux generating current parameter by a motor resistance parameter to generate a first component; and
multiplying the first component by a stall ratio to generate the stall threshold.

14. The motor controller of claim 13, wherein:
the stall ratio is greater than or equal to one.

15. The motor controller of claim 8, wherein:
the stall detection unit is configured to generate the stall threshold based on a rate of change of the torque generating current parameter.

16. The motor controller of claim 15, wherein:
the stall detection unit is configured to generate the stall threshold by:
multiplying the rate of change of the torque generating current parameter by a motor inductance parameter to generate a first component;
multiplying the torque generating current parameter by a motor resistance parameter to generate a second component;
adding the first component to the second component to generate a third component; and
multiplying the third component by a stall ratio to generate the stall threshold.

17. The motor controller of claim 16, wherein:
the stall ratio is greater than one.

18. A method for controlling a motor comprising:

receiving a three-phase motor current measurement;

transforming the three-phase motor current measurement to generate a flux generating current parameter and a torque generating current parameter associated with the motor;

generating an estimated motor speed parameter based on the torque generating current parameter and the flux generating current parameter;

generating a drive signal for the motor based on a demand speed parameter and the estimated motor speed parameter;

generating a stall threshold based on the torque generating current parameter;

identifying a motor stall condition based on a component of the drive signal violating the stall threshold; and removing the drive signal responsive to identifying the motor stall condition.

19. The method of claim 18, wherein:

the component of the drive signal comprises a demand torque generating voltage parameter; and generating the stall threshold comprises:

multiplying a rate of change of the torque generating current parameter by a motor inductance parameter to generate a first component;

multiplying the torque generating current parameter by a motor resistance parameter to generate a second component;

adding the first component to the second component to generate a third component; and multiplying the third component by a stall ratio to generate the stall threshold.

20. The method of claim 18, wherein:

generating the stall threshold comprises:

determining a magnitude of the torque generating current parameter and the flux generating current parameter;

multiplying the magnitude of the torque generating current parameter and the flux generating current parameter by a motor resistance parameter to generate a first component; and multiplying the first component by a stall ratio to generate the stall threshold.

\* \* \* \* \*